United States Patent

[11] 3,550,837

[72] Inventor George H. Erb
Rutland, Vt.
[21] Appl. No. 815,849
[22] Filed Apr. 14, 1969
[45] Patented Dec. 29, 1970
[73] Assignee American Velcro, Inc.
a corporation of New Hampshire

[54] RELEASABLE CLOSURE FASTENING MEANS
6 Claims, 6 Drawing Figs.

[52] U.S. Cl. ................................................. 229/45,
150/42; 24/204
[51] Int. Cl. .................................................. B65d 45/00
[50] Field of Search .......................................... 229/44, 45,
77; 150/42; 24/204

[56] References Cited
UNITED STATES PATENTS

| | | | |
|---|---|---|---|
| 3,325,084 | 6/1967 | Ausnit .......................... | 229/77 |
| 3,464,094 | 9/1969 | Mates ........................... | 24/204 |
| 3,494,006 | 2/1970 | Brumlik ......................... | 24/204 |

Primary Examiner—George T. Hall
Attorney—Pennie, Edmonds, Morton, Taylor and Adams ABSTRACT: In a closure device having two members each member has secured engaging elements which define an engaging surface the engaging elements comprising granules of a hard solid material affixed to one of the members and loops of a flexible resilient material secured to the other member.

PATENTED DEC 29 1970
3,550,837
FIG. 3
FIG. 1
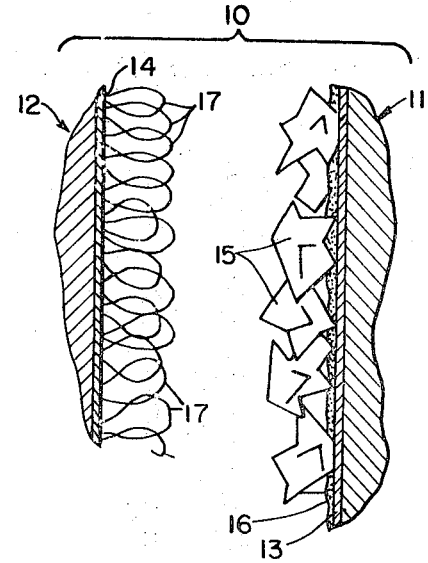
FIG. 2
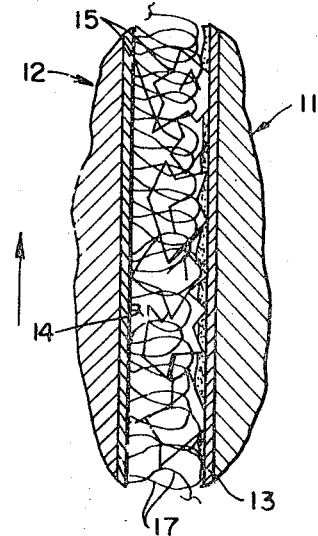
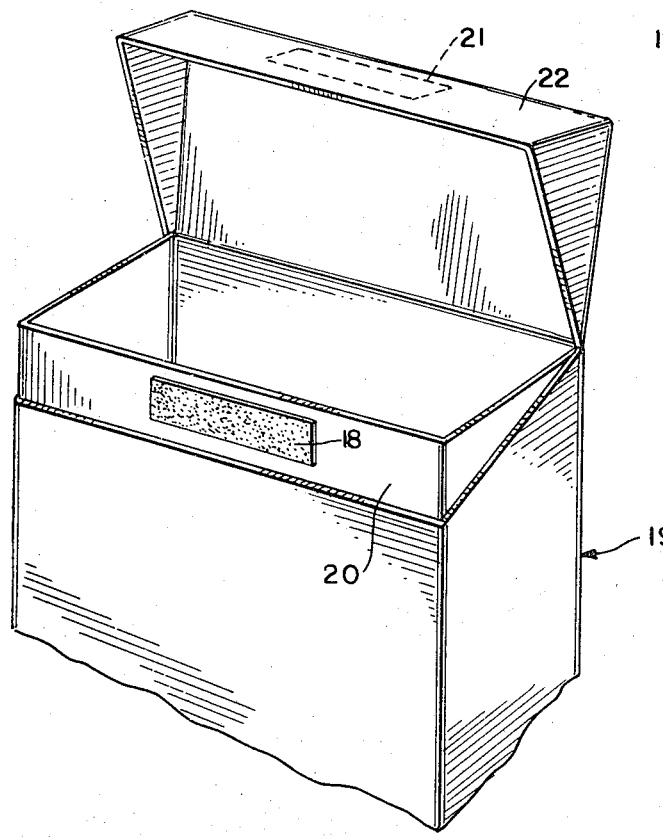
FIG. 4
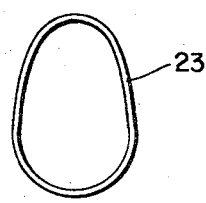
FIG. 5
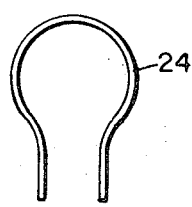
FIG. 6
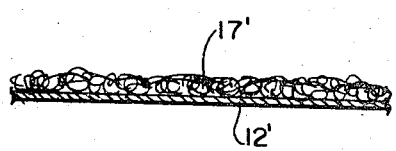
INVENTOR
GEORGE H. ERB
BY
Pennie, Edmonds, Morton, Taylor & Adams
ATTORNEYS 3,550,837

RELEASABLE CLOSURE FASTENING MEANS

BACKGROUND OF THE INVENTION

This invention relates to separable fasteners and more particularly to separable fasteners which are used as closure devices.

Separable fasteners such as those described in U.S. Pat. Nos. 2,717,437 and 3,009,235 which are hook and loop touch fasteners have gained wide acceptance. Engagement of mating parts will occur by placing the surface defined by the hooks into face-to-face relationship with the surface defined by the loops. Such fasteners resist separation paralleled to the interfacial plane of engagement but are separable by peeling forces applied substantially normal to this interfacial plane. Fasteners of this type have been used successfully as closure devices, as for example in carrying cases. However, their use is circumscribed by a relatively high manufacturing cost and by the rather substantial peeling force required to separate all but the smallest unit area of fastener. Thus, where an extremely low-cost closure device is required or where a uniform closure must be effected between substantial unit areas of two members and there is also a risk that one of the members will be permanently deformed under the peeling forces required for separation, the fasteners of the type described above will ordinarily not be suitable.

It is the principal object of this invention to provide a closure device which exerts a modest closure force over substantial unit areas of closure and which may be produced in large quantities efficiently and inexpensively.

More specifically, the invention provides a separable closure device for disposable containers which is suitable for uniformly securing the full width of a top or a flap of the container against opening, but releasable under a peeling force substantially less than that which would deform the top or flap. In accordance therewith, a coupling area of one closure member is coated with an adhesive upon which is a dense layer of granules of an irregular shape and having multifaceted surfaces. The layer of granules may be termed a male engagement surface. The female member of the closure device is produced by flocking filamentary loop-shaped elements onto the mating element of said device, which has been covered by a suitable adhesive to form a multitude of closed-loop portions upstanding from the adhesive. By pressing the respective closure members together, the multifaceted granules will engage and be held by the loop-shaped elements to complete and inexpensive closure device which is particularly useful on the closing flaps of disposable food packages, cartons and the like.

A further understanding of the invention will be had from the embodiments and description set out below wherein:

BRIEF DESCRIPTION OF THE DRAWINGS

FIG. 1 is an enlarged diagrammatic view of the closure device of the invention;

FIG. 2 is an enlarged diagrammatic view of the closure device when engaged;

FIG. 3 is a perspective of a carton using the closure device of the invention;

FIGS. 4 and 5 show loop elements suitable for use in one embodiment of the method of the invention;

FIG. 6 shows another form of the loops attached to a closure member.

DESCRIPTION OF THE PREFERRED EMBODIMENT

Referring to FIG. 1, a closure device 10 according to the present invention comprises two closure members 11, 12 having respectively engaging surfaces 13, 14. Granules 15 are adhesively bonded to a male member 11 by a suitable adhesive 16, in a dense layer to form the surface 13. The granules 15 preferably are hard, have an irregular shape and comprise a number of tiny flat planes forming a multifaceted surface. The granules 15 are closely spaced and as shown in some instances a portion of one granule will overlap a portion of an adjacent granule. While it is preferred to provide the granules 15 by spraying them directly onto the surface 13, which has been suitably treated to receive and hold them, the granules can be provided in any manner consistent with the requirement that the granules 15 substantially cover the engaging surface 13. The granules can be of natural of synthetic material as, for example, quartz, silica or plastic.

A female closure member 12 has a multiplicity of small loops 17 extending outwardly to form the engaging surface 14. The loops 17 are preferably of thin filamentary material which may be either natural or synthetic but in the preferred embodiment is nylon. These loops 17 are closely spaced and form a dense mass of engaging elements suitable for catching on the irregular multifaceted surface of the granules 15. While it is preferred to provide the loops 17 by flocking closed strands directly onto the surface 14 which has been suitably treated to receive and hold the loops 17 in an upright manner, it is also possible to provide the loops 17 by weaving a base fabric containing supplementary warp threads or by knitting. Moreover, the term "loop" as used herein may also include any looplike element generally of the configuration shown in FIGS. 4 and 5 which is not necessarily secured at one or either of its ends and is so entangled in or formed by a mass of random fibers that it is capable of resisting a tension force applied normal to its length when engaged by multifaceted granular elements such as 15. Thus, as shown in FIG. 6, suitable loops 17' can also be formed in conjunction with a closure member 12' by needling or otherwise forming a mass of randomly oriented fibers so that the fibers become thoroughly entangled.

Here it should be mentioned that the closure members 11, 12 and 12' can be of any material which can be adapted to bear the engaging elements 15, 17 and 17'. However, it is preferred to use a sheet material of relatively light weight an d thin gauge as, for example, paper, cellophane or thin cardboard. It should also be understood that the closure member 11 or 12 does not lose its character as part of a closure device when the material on which the engaging elements are provided is also an integral part or surface area of a layer structure.

In FIG. 2 the disposition of the engaging elements comprising granules 15 and loops 17 is shown as it occurs when the engaging surfaces 13, 14 are placed in face-to-face relationship and a force is applied to one or both of the members 11, 12 in the plane of engagement to displace one of the engaging surfaces relative to the other. It will be understood that the term "plane of engagement" refers to a virtual plane defined between the two engaging surfaces 13, 14 which represents the resultant of all discrete engagements between engaging elements. For convenience, the terms "male" and "female" will be used respectively as to closure members 11 and 12 and engagement surfaces 13 and 14.

On initial face-to-face engagement, some of the loops 17 catch on irregularities and facets of the granules 10. But the number of discrete engagements is not substantial since most of the loops 17 merely contact the granules 15 and are not caught thereon. Therefore, the closure device 10 can be readily separated by merely lifting one engaging surface away from the other.

On the other hand, if a force substantially parallel to the plane of engagement is applied to one of the members, for example, the male closure member 11, engagement surface 13 will be displaced relative to the female closure member 13 and engagement surface 14. As engaging surface 13 is displaced in the plane of engagement additional loops 17, from among those which previously were merely in contact with the granules 15, slip over the granules 15 and become caught. Since the loop material is resilient, the loops 17 can be somewhat elongated after their engagement. Thus, as displacement of male engagement surface 13 continues other loops 17 which as still unengaged are presented to and catch upon the granules 15, until the greater portion of the loops 17 are caught and the closure device 10 if firmly engaged. Even though the force which displaces the male engagement surface 13 is subsequently relieved, such that the loops 17 tend to return to their unstretched, unengaged condition, the number of loops which remain caught is substantially greater than that number which are caught when the loops and granules are merely placed in face-to-face engagement. In other words, the engagement of the closure device 10 is positive and a definite peeling force between the two members, applied substantially normal to the phase of engagement, is required to separate the closure device 10. Of course, if the force parallel to the plane of engagement continues in effect the peeling force required for separation will be proportionately greater owing to the greater number of loops 17 which are caught as explained above.

The closure device described above is particularly suited for providing a uniform and neat closure for containers such as disposable cardboard food packages or cartons. One of the engaging elements can be provided either partially or wholly around the body of the container while the other is provided on the surface of a flap or top which is intended to fit securely against the body of the container when the container is closed. For example, referring to FIG. 3, a strip 18 bearing the granules 15 is applied just below the marginal upper end of the exterior side 20 of a box 19. A corresponding strip 21 bearing the loops 17 is applied to the underside of a flap 22 which is designed to cover the portion of the exterior side 20 of the box 19 to which the strip 18 is affixed when the box is closed. It is also possible to provide the engaging elements directly on the box or flap without the supporting strips 18 and 21 and to interchange the engaging elements, that is, to provide loops 17 on the side 20 and granules 15 on flap 22. It is also possible to provide both types of engaging elements on both the side 20 and flap 22.

In closing the box, the engaging elements are readily engaged by pressing the flap 22 inward and upward against the strip 18. To open, the flap 22 is merely lifted outward providing the requisite peeling force between the strips 18 and 21.

When closed the box flap is held neatly against the side of the box. Since the force required for separation of the closure device is modest, the flap need not be reinforced but can be of the same thickness as the body of the box without fear that it will become wrinkled or acquire an abused look after the box has been opened and reclosed several times. When the box is empty it can be discarded since this type of closure device will be competitive with presently known and less effective closure means.

While the preferred embodiments of the invention have been heretofore described, it is to be clearly understood that various modifications can be made in the details of the invention described herein without departing from the spirit of the invention and the scope of the appended claims.

I claim:

1. A releasable closure device comprising male and female members, each member having a multitude of closely spaced engaging elements defining an engaging surface of said member, said elements of said male member comprising irregularly shaped granules, said granules having a multifaceted surface and being affixed on said male member to define said engaging surface of said member, and said elements of said female member comprising loops of a flexible resilient material, said loops being secured to said loop member and defining a second engaging surface so that when said engaging surfaces are placed in face-to-face relationship and one of said surfaces is displaced with respect to the other in their plane of engagement, a large number of said granules and loops will engage and resist separation parallel to the plane of engagement but are readily separated by peeling forces applied substantially normal to said plane of engagement.

2. A releasable closure device according to claim 1 wherein said loops and granules are fixed by adhesive to respective backing surfaces.

3. A releasable closure device according to claim 2 in which said closure members are the flap cover and body portions of a disposable food package or carton.

4. A releasable closure device according to claim 1 wherein at least one of said members has a base of sheet material secured thereto with one of said engaging elements secured to said base sheet, said base sheet and engaging elements defining an engaging surface of said member.

5. In a container having a closure portion comprising two members, one of said members overlying the other when said container is closed, the improvement in combination therewith comprising a releasable container closure device wherein a multitude of closely spaced engaging elements define an engaging surface on each of said members, said engaging elements of one member comprising irregularly shaped granules, said granules having a multifaceted surface and being affixed on and defining said engaging surface of said member, and said engaging elements of the second member comprising loops of a flexible resilient material, said loops secured to said second member and upstanding from said engaging surface thereof, whereby in placing said engaging surfaces in face-to-face relationship and displacing one of said surfaces with respect to the other in their plane of engagement, a large number of said granules and loops engage and resist separation parallel to the plane of engagement but are readily separated by peeling forces applied substantially normal to this plane.

6. Container closure device according to claim 5 wherein said container is a box having a flap overlying an upper marginal side of said box when said box is closed, one type of said engaging elements secured to the underside of said flap and the other type of said elements secured to said upper side whereby in pressing said flap inward and upward against said upper side said container closure device is engaged.